United States Patent [19]

Carumpalos et al.

[11] 4,163,001
[45] Jul. 31, 1979

[54] WATER BASE FLEXOGRAPHIC DYE INK

[75] Inventors: Constantine G. Carumpalos; Harry E. Pansing, both of Cincinnati, Ohio

[73] Assignee: Borden, Inc., Columbus, Ohio

[21] Appl. No.: 945,220

[22] Filed: Sep. 25, 1978

Related U.S. Application Data

[63] Continuation of Ser. No. 365,337, May 30, 1973, abandoned.

[51] Int. Cl.² ............................................. C09D 11/10
[52] U.S. Cl. .......................... 260/29.6 MN; 106/20; 260/29.2 R; 260/29.4 UA; 260/29.6 RB; 260/29.6 WB; 260/29.6 HN; 260/29.6 N; 260/29.6 E; 260/42.21
[58] Field of Search ................. 260/29.2 R, 29.4 UA, 260/29.6 MN, 29.6 RB, 29.6 WB, 29.6 HN, 29.6 N, 29.6 E, 42.21

[56] References Cited

U.S. PATENT DOCUMENTS

| | | | |
|---|---|---|---|
| 3,687,887 | 8/1972 | Zabiak | 260/29.6 WB |
| 3,766,116 | 10/1973 | Olhoft | 260/29.6 HN |
| 3,776,758 | 12/1973 | Epple | 260/33.4 R |

OTHER PUBLICATIONS

Apps, E. A., Printing Ink Technology, Leonard Hill Books Ltd., London, pp. 167–169, (1958).
"Joncryl 67 Acrylic Resin," Johnson Wax, (Nov. 1971).
"Printan G," (Authorship and Precise Publication Date Unknown).
"Joncryl 68 Acrylic Resin," Johnson Wax, (Apr. 1973).

*Primary Examiner*—Lucille M. Phynes
*Attorney, Agent, or Firm*—George A. Kap; George P. Maskas; Daniel D. Mast

[57] ABSTRACT

A water base flexographic dye ink concentrate comprising a laked alkali stable basic dye containing at least one amino group, the laking agent being an acidic resin, dispersed in a liquid medium consisting essentially of butyl carbitol, water, dissolved sodium benzoate, a nonionic surfactant, a defoamer, a dissolved acrylic acid resin, and sufficient aminoalcohol to give a slightly acidic pH. The ink concentrate is cut back with a mixture of propylene glycol and water and the pH adjusted to about 8.0–9.0 with an aminoalcohol to give a water base flexographic dye ink suitable for printing on paper towels, facial tissues, and tiolet tissues.

9 Claims, No Drawings

WATER BASE FLEXOGRAPHIC DYE INK

This is a continuation of application Ser. No. 365,337, filed May 30, 1973.

BACKGROUND OF THE INVENTION

There is a need for an economical ink suitable for printing on paper towels, facial tissues, toilet tissues, and the like which has such desirable properties as being stable to water and detergents, non-irritating to the skin, non-toxic, and capable of being bleached by chlorine at the sewage treatment plant or at the paper mill whereby waste towels and tissues printed with such inks may be recovered for recycling. It is also desirable that the ink be noncorrosive to thereby extend the life of printing presses and printing plates.

Prior art inks for printing on paper products such as towels and tissues often have a number of the foregoing deficiencies. For example, inks which derive their color from pigments are generally not chlorine bleachable, hence difficulty is experienced in recycling the printed paper or in treating it at the sewage treatment plant. Some inks are run on the press in acidic media, thereby causing corrosion of metal parts and producing tackiness on natural rubber printing plates. Other inks may irritate the skin or be adversely affected by water or detergents.

SUMMARY OF THE INVENTION

It is therefore an object of this invention to provide an economical flexographic ink concentrate having high color strength.

It is another object of this invention to provide a water base flexographic dye ink having chlorine bleachability as well as water and detergent stability.

It is yet another object of this invention to provide a water base flexographic dye ink that is non-toxic and non-irritating to the skin.

Still other objects will be apparent to those skilled in the art.

The foregoing objects are achieved according to the practice of this invention. Broadly, this invention comprises a water base flexographic dye ink concentrate comprising a laked alkali stable basic dye containing at least one amino group, the laking agent being an acidic resin, dispersed in a liquid medium consisting essentially of butyl Carbitol ®, water, dissolved sodium benzoate, a nonionic surfactant, a defoamer, a dissolved acrylic acid resin, and sufficient aminoalcohol to give a slightly acidic pH; and a water base flexographic dye ink composition comprising a major proportion of a mixture of propylene glycol and water and a minor proportion of the ink concentrate of the invention plus an amount of an aminoalcohol sufficient to give a pH of about 8.0 to about 9.0. Butyl Carbitol is a trademark of Union Carbide.

Thus, by the practice of this invention there are provided a water base flexographic dye ink concentrate having high color strength and a water base flexographic dye ink composition having a number of desirable properties. The high color strength of the ink concentrate permits cutting back with large volumes of water to form the ink composition. The ink is non-toxic and non-irritating to the skin and in addition is stable to water and detergents, advantages for inks used to print on paper towels and tissues and the like. In addition, the ink is chlorine bleachable, a factor which is advantageous for recovering and recycling waste towels and tissues at the paper mill and for processing such towels and tissues at a sewage treatment plant. Also, since the inks are basic, they do not tend to corrode metal parts of printing presses or to attack natural rubber printing plates.

DETAILED DESCRIPTION

This invention is concerned with a water base flexographic dye ink concentrate having high color strength which permits cutting back the concentrate with a large volume of water to form a water base flexographic dye ink composition. These ink compositions have particular utility in printing on paper towels and tissues and are characteristic by being chlorine bleachable, non-toxic, non-irritating to the skin, and stable to water and detergents. The ink concentrate comprises a laked alkali stable basic dye containing at least one amino group, the laking agent being an acidic resin, dispersed in a liquid medium consisting essentially of butyl carbitol, water, dissolved sodium benzoate, a nonionic surfactant, a defoamer, a dissolved acrylic acid resin, and sufficient aminoalcohol to give a slightly acidic pH. The ink composition is prepared by cutting back the ink concentrate with a mixture of propylene glycol and water and adding a sufficient amount of an aminoalcohol to impart to the ink composition a pH within the range of about 8.0 to about 9.0.

The flexographic dye ink concentrate is prepared by dissolving in butyl carbitol, i.e., diethylene glycol monobutyl ether, a suitable alkali stable basic dye containing at least one amino group, an acidic resin laking agent, and sodium benzoate. The basic dye and the acidic resin laking agent react to form a complex salt or lake. A separate aqueous phase comprising a water soluble acrylic acid resin, preferably in alkaline aqueous solution having a pH of about 8 to 9, is also prepared.

The butyl carbitol solution and the alkaline aqueous solution are brought together and the resulting mixture has a pH of about 5. An aminoalcohol is then added to raise the pH to slightly acidic, preferably in the area of about pH 6.8. The butyl carbitol and water are miscible but the basic dye laked by the acidic resin is insoluble and separates as a colloidal dispersion. The dispersion of laked dye is stabilized with a nonionic surfactant and a defoamer is added to yield the flexographic dye ink concentrate.

The water base flexographic dye ink composition of this invention is prepared by adding propylene glycol to the foregoing ink concentrate and introducing an amount of an aminoalcohol sufficient to give a pH of about 8.0 to about 9.0 and preferably a pH of about 8.1 to about 8.8. The mixture is then cut back with water in the amount of about 0.75 to about 5, and preferably about 1 to about 4, parts by volume of water per part by volume of ink concentrate. The ink at this point is ready for use.

The choice of butyl carbitol as the solvent for the basic dye, the acidic laking agent, and sodium benzoate is due to several factors. It is chosen not only for its water miscibility but also for its high flash point, low toxicity, and because is does not cause skin irritation.

The dyes suitable for use in the practice of this invention are broadly alkali stable basic dyes containing at least one amino group. It will be understood that one or more of the amino groups may be substituted amino groups, i.e., secondary or tertiary amino groups. Alkali stability, i.e., the ability of the dye not to decolorize in an alkaline medium, is necessary since the water base flexographic dye ink composition of this invention has a pH in the range of about 8.0 to about 9.0. While alkali stable basic dyes having at least one amino group may in general be used in the ink concentrates and ink compositions of this invention, it is preferred that the basic dyes be selected from among xanthene or rhodamine dyes, diphenyl methane dyes, triaryl methane dyes, and mixtures thereof. Especially suitable diphenyl methane dyes are the Auramine dyes, particularly Auramine OSS manufactured by Ciba-Geigy Corporation and Auramine FWA manufactured by BASF-Wyandotte Corporation. Particularly suitable xanthene dyes are Rhodamine B Extra manufactured by DuPont Company and Rhodamine F5G manufactured by BASF-Wyandotte Corporation. Especially suitable triaryl methane dyes are Victoria Blue B manufactured by DuPont Company and Astrazon Blue G marketed by Verona Dyestuff Company.

The basic dyes of this invention, as pointed out above, must be stable in alkali, i.e., must not be decolorized in an alkaline medium. The function of the sodium benzoate in the butyl carbitol solution of basic dye and acidic resin laking agent is to enhance the color stability of the basic dye in the alkaline ink medium.

The laking agents which react with the basic dyes to form lakes thereof are acidic resins. The preferred acidic resins are of two general types, namely, phenolic resins where acidity is due to phenolic hydroxyl groups and acrylic acid resins where acidity is due to free carboxyl groups. A particularly preferred phenolic resin is Printan G which is manufactured by Ciba-Geigy Corporation. An especially preferred acrylic acid resin is Joncryl 68 which is manufactured by S. C. Johnson & Son, Inc. Printan G and Joncryl 68 may be used individually or in combination.

The aqueous solution of a water soluble acrylic acid resin that is combined with the butyl carbitol solution is preferably an alkaline aqueous solution which typically has a pH of about 8–9. The water soluble acrylic acid resin may be an acrylic acid resin, a methacrylic acid resin, or a resinous copolymer or acrylic acid and methacrylic acid. When the aqueous solution of the acrylic acid resin is combined with the butyl carbitol solution, the acrylic acid resin remains in solution. The function of the acrylic acid resin in the ink composition is to act as a binder for the ink. A preferred acrylic acid resin is obtained from a 30 weight percent solution of an acrylic acid resin in alkaline aqueous solution having a pH within the range of about 8–9 marketed by Lawter Chemicals, Incorporated under the name Aqua Hyde 3013. This aqueous solution of acrylic acid resin is low in viscosity and the acrylic acid resin is stable in both acidic and basic media.

When the butyl carbitol solution of laked dye and sodium benzoate is combined with the alkaline aqueous solution of the acrylic acid resin, the resultant mixture has an acidic pH in the vicinity of about 5. The pH is brought up to slightly acidic, preferably to a pH of about 6.8, by the addition of the appropriate amount of an aminoalcohol. The preferred aminoalcohols are 2-dimethylaminoethanol, 2-dimethylamino-2-methyl-1-propanol, and mixture thereof. Aminoalcohols are used rather than, for example, ammonium hydroxide because use of the aminoalcohols results in superior dye stability.

As discussed above, when the butyl carbitol solution of sodium benzoate and dye laked with the acidic resin is mixed with the aqueous solution of acrylic acid resin, the laked dye separates as a colloidal dispersion. The dispersion of laked dye in the liquid medium is stabilized by means of a nonionic surfactant. Nonionic surfactants in general are useful. Examples of suitable nonionic surfactants are polyvinylalcohol and polyvinylpyrrolidone. A particularly preferred nonionic surfactant, partially because of its utility over a broad pH range, is Zonyl A which is manufactured by DuPont Company.

The water base flexographic dye ink concentrate of this invention contains a defoamer. While defoamers in general may be used, conventional silicone emulsion defoamers are preferred. An example of a particularly suitable silicone emulsion defoamer is PG-10 manufactured by Dow Corning Company.

The composition of the water base flexographic dye ink concentrate of this invention may vary over a broad range. The following table contains a listing of the components of the ink concentrate and the quantity of each component, reciting both the broad range and the preferred range of quantities thereof. All parts are parts by weight.

|  | Parts by Weight, Broad Range | Parts by Weight, Preferred Range |
| --- | --- | --- |
| Butyl Carbitol | 30–55 | 35–50 |
| Basic Dye | 1–10 | 2–8 |
| Sodium Benzoate | 0.25–5.0 | 0.5–2.0 |
| Resinous Laking Agent | 5–20 | 10–15 |
| Nonionic Surfactant | 1–3 | 2 |
| Defoamer | 0.05–0.20 | 0.1 |
| Water | 20–35 | 25–30 |
| Water Soluble Acrylic Acid Resin | 5–10 | 7–9 |
| Aminoalcohol | 1–5 | 1.5–3.0 |

The water base flexographic dye ink compositions of this invention are prepared by cutting back the ink concentrate with a mixture of propylene glycol and water and adjusting the pH to about 8.0 to about 9.0, and preferably to about 8.1 to about 8.8, by the addition thereto of the proper amount of an aminoalcohol. The ink is commonly prepared by adding propylene glycol to the ink concentrate in the amount of about 0.05 to about 0.20 part by volume of propylene glycol per part by volume of ink concentrate. Preferably, about 0.10 to about 0.15 part by volume of propylene glycol is added per volume of ink concentrate. Taking into consideration the pH of the water to be added and the desired pH of the finished ink, an aminoalcohol is added in an amount that will give a final pH of about 8.0 to about 9.0 and preferably about 8.1 to about 8.8. The mixture is then cut back by the addition of about 0.75 to about 5, and preferably about 1 to about 4, parts by volume of water per part by volume of ink concentrate. If the pH of the finished ink is outside the desired pH range, the pH may be adjusted by adding either an acid or additional aminoalcohol. While the choice of aminoalcohol for adjusting the pH of the ink is not especially critical, preferred are 2-dimethylaminoethanol, 2-dimethylamino-2-methyl-1-propanol, and mixtures thereof.

This invention will be further illustrated by the following specific examples.

EXAMPLE I

A water base flexographic dye ink concentrate is prepared as follows. To butyl carbitol are added basic dye consisting of Auramine OSS and Astrazon Blue G, sodium benzoate, and Printan G as the acidic resin laking agent. A separate aqueous phase is prepared by adding to water Aqua Hyde 3013 which is a 30 weight percent solution of an acrylic acid resin in an alkaline aqueous solution. The butyl carbitol solution and the aqueous solution are combined whereupon the basic dye laked with the acidic resin separates as a colloidal dispersion. The pH of the mixture is adjusted to about 6.8 by the addition of 2-dimethylaminoethanol. The dispersion of laked dye is then stabilized by the addition of Zonyl A nonionic surfactant and a silicone emulsion defoamer is added. The resultant water base flexographic dye ink concentrate is green in color. The quantities of the components, expressed as parts by weight, are as follows:

| butyl carbitol | 46.95 parts |
|---|---|
| Auramine OSS | 1.00 |
| Astrazon Blue G | 1.00 |
| sodium benzoate | 0.50 |
| Printan G laking agent | 12.15 |
| Zonyl A surfactant | 2.00 |
| silicone defoamer | 0.10 |
| water | 8.05 |
| Aqua Hyde 3013 | 26.25 |
| 2-dimethylamino-ethanol | 2.00 |

The foregoing green ink concentrate is particularly suitable for the formulation of inks for printing on paper towels.

EXAMPLE II

An avocado ink concentrate especially suitable for inks intended for printing on paper towels is prepared according to the procedure of Example I. The aminoalcohol used in the concentrate is an 80% aqueous solution of 2-dimthylamino-2-methyl-1-propanol (DMAMP-80). The makeup of the ink concentrate, with all quantities expressed as parts by weight, is as follows:

| butyl carbitol | 39.73 parts |
|---|---|
| Auramine OSS | 2.00 |
| Astrazon Blue G | 1.70 |
| Rhodamine F5G | 0.47 |
| sodium benzoate | 0.75 |
| Printan G laking agent | 15.00 |
| Zonyl A surfactant | 2.00 |
| silicone defoamer | 0.10 |
| water | 10.00 |
| Aqua Hyde 3013 | 26.25 |
| DMAMP-80 | 2.00 |

EXAMPLE III

A yellow ink concentrate that is particularly suitable for conversion to an ink for printing on tissues is prepared according to the procedure of Example I. The makeup of the ink concentrate, with all quantities expressed as part by weight, is as follows:

| butyl carbitol | 35.25 parts |
|---|---|
| Auramine OSS | 7.50 |
| sodium benzoate | 2.00 |
| Printan G laking agent | 7.50 |
| Joncryl 68 laking agent | 7.50 |
| Zonyl A surfactant | 2.00 |
| silicone defoamer | 0.10 |
| water | 10.00 |
| Aqua Hyde 3013 | 26.25 |
| DMAMP-80 | 1.90 |

EXAMPLE IV

A pink ink concentrate that is particularly suitable for conversion to an ink for printing on tissues is prepared according to the procedure of Example I. The makeup of the ink concentrate, with all quantities expressed as parts by weight, is as follows:

| butyl carbitol | 41.65 parts |
|---|---|
| Rhodamine B Extra | 5.00 |
| sodium benzoate | 2.00 |
| Printan G laking agent | 5.00 |
| Joncryl 68 laking agent | 5.00 |
| Zonyl A surfactant | 2.00 |
| silicone defoamer | 0.10 |
| water | 10.00 |
| Aqua Hyde 3013 | 26.25 |
| DMAMP-80 | 3.00 |

EXAMPLE V

A water base flexographic dye ink composition is prepared as follows. To 14 gallons of the avocado ink concentrate of Example II are added 1.5 gallons of propylene glycol. The pH is adjusted by adding 1 liter of 2-dimethylaminoethanol. The mixture is then cut back by adding 14 gallons of water having a pH of 6.0. The pH of the resultant ink composition is 8.1. The ink is found to satisfactorily print on a paper towel substrate.

EXAMPLE VI

A water base flexographic dye ink composition is prepared as described in Example V. To 12 gallons of the pink ink concentrate of Example IV are added 1.5 gallons of propylene glycol. The pH is adjusted by adding 0.9 liter of 2-dimethylaminothanol. The mixture is then cut back by adding 48 gallons of water having a pH of 7.6. The pH of the resultant ink composition is 8.8. The ink is found to satisfactorily print on a paper tissue substrate.

While this invention has been exemplified by specific examples, it will be understood that it is not limited thereto. Thus, by the practice of this invention there are provided a water base flexographic dye ink concentrate having high color strength and a water base flexographic dye ink composition having a number of desirable properties. The high color strength of the ink concentrate permits cutting back with large volumes of water to form the ink composition. The resultant ink is non-toxic and non-irritating to the skin and in addition is stable to water and detergents, advantages for inks used to print on paper towels and tissues and the like. In addition, the ink is chlorine bleachable, a factor which is advantageous for recovering and recycling waste towels and tissues at the paper mill and for processing such towels and tissues at sewage treatment plants. Also, since the inks are basic, they do not tend to corrode metal parts of printing presses or to attack natural rubber printing plates.

We claim:

1. A water-based chlorine-bleachable dye ink concentrate comprising 1-10 parts by weight of an alkali-stable basic dye containing at least one amino group laked by reaction with 5-20 parts by weight of a laking resin selected from the group consisting essentially of acidic phenolic resins, acidic acrylic resins and mixtures thereof, in a liquid medium consisting essentially of 30-55 parts by weight of butyl Carbitol ®, 20-35 parts by weight of water, 0.25-5 parts by weight of dissolved sodium benzoate, 1-3 parts by weight of a nonionic surfactant, 0.05-0.2 part by weight of a defoamer, 5-10 parts by weight of a dissolved acrylic acid binder resin, and 1-5 parts by weight of aminoalcohol.

2. The ink concentrate of claim 1 wherein said defoamer is a silicone defoamer and said basic dye is selected from the group consisting of xanthene dyes, diphenyl methane dyes, triaryl methane dyes, and mixtures thereof.

3. The ink concentrate of claim 2 wherein 2-8 parts of said basic dye are laked by reaction with 10-15 parts of said laking resin and wherein said liquid medium consists essentially of 35-50 parts of butyl Carbitol, 25-30 parts of water, 0.5-2 parts by weight of dissolved sodium benzoate, about 2 parts by weight of said nonionic surfactant, about 0.1 part by weight of said silicone defoamer, 7-9 parts by weight of said acrylic binder resin, and 1.5-3 parts by weight of said aminoalcohol.

4. The ink concentrate of claim 3 wherein said aminoalcohol is selected from the group consisting of 2-dimethylaminoethanol, 2-dimethylamino-2-methyl-1-propanol, and mixtures thereof; and said nonionic surfactant is Zonyl A ®.

5. The ink concentrate of claim 4 wherein said basic dye is selected from the group consisting of Auramine ®, Rhodamine B Extra ®, Rhodamine F5G ®, Victoria Blue B ®, Astrazone Blue G ®, and mixtures thereof.

6. A water-based dye ink composition comprising a major proportion of a mixture of propylene glycol and water, a minor proportion of the ink concentrate of claim 1, and a sufficient amount of an aminoalcohol to give a pH of about 8 to 9.

7. A water-based dye ink composition consisting essentially of 1 part by volume of the ink concentrate of claim 4, about 0.05-0.2 part by volume of propylene glycol, about 0.75-5 parts by volume of water, and a sufficient amount of an aminoalcohol to give a pH of about 8.1 to 8.8.

8. A water-based dye ink composition consisting essentially of 1 part by volume of the ink concentrate of claim 5, about 0.10-0.15 part by volume of propylene glycol, about 1-4 parts by volume of water, and sufficient 2-dimethylaminoethanol to give a pH of about 8.1 to 8.8.

9. A water-based ink composition comprising 1 part by volume of the ink concentrate of claim 1, about 0.05-0.2 part by volume of propylene glycol, about 0.75-5 parts by volume of water and sufficient amount of an aminoalcohol to give a pH of about 8 to 9; the basic dye being selected from xanthene dyes, diphenyl methane dyes, triaryl methane dyes, and mixtures thereof; the defoamer is a silicone defoamer; and the nonionic surfactant is Zonyl A ®.

* * * * *